United States Patent
Jeng et al.

(10) Patent No.: US 9,614,705 B2
(45) Date of Patent: Apr. 4, 2017

(54) CONSTANT-ENVELOPE PHASE-OPTIMIZED TRANSMISSION METHODS AND APPARATUS

(71) Applicant: The Boeing Company, Chicago, IL (US)

(72) Inventors: Isaac M. Jeng, Yorba Linda, CA (US); Brandon M. Jones, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/717,814

(22) Filed: May 20, 2015

(65) Prior Publication Data

US 2016/0344579 A1 Nov. 24, 2016

(51) Int. Cl.
| | |
|---|---|
| *H04L 27/36* | (2006.01) |
| *H04L 27/20* | (2006.01) |
| *H04J 13/00* | (2011.01) |
| *H04J 13/12* | (2011.01) |
| *H04L 27/00* | (2006.01) |
| *H04B 1/707* | (2011.01) |

(52) U.S. Cl.
CPC .......... *H04L 27/20* (2013.01); *H04J 13/0003* (2013.01); *H04J 13/12* (2013.01); *H04B 1/707* (2013.01); *H04L 2027/0032* (2013.01); *H04L 2027/0057* (2013.01)

(58) Field of Classification Search
CPC ..... H04L 2027/0057; H04L 2027/0032; H04L 27/20; H04B 1/707; H04J 13/0003; H04J 13/12
See application file for complete search history.

(56) References Cited

U.S. PATENT DOCUMENTS

| | | |
|---|---|---|
| 5,267,271 A | 11/1993 | Rice |
| 8,774,315 B2 | 7/2014 | Cahn et al. |
| 9,485,126 B2 | 11/2016 | Jeng |
| 2003/0215030 A1* | 11/2003 | Hurley .......... H04B 1/707 375/322 |
| 2004/0009784 A1 | 1/2004 | Ohkubo et al. |
| 2004/0208525 A1 | 10/2004 | Seydnejad et al. |
| 2009/0034635 A1* | 2/2009 | Golitschek Edler Von Elbwart ... H04L 1/18 375/260 |
| 2011/0051783 A1* | 3/2011 | Cahn .............. H04B 1/707 375/146 |
| 2016/0056983 A1 | 2/2016 | Jeng |

OTHER PUBLICATIONS

"U.S. Appl. No. 14/465,515," filed Aug. 21, 2014, 53 pages.

(Continued)

*Primary Examiner* — Janice Tieu
(74) *Attorney, Agent, or Firm* — Hanley, Flight & Zimmerman, LLC

(57) ABSTRACT

Constant-envelope phase-optimized transmission methods and apparatus are disclosed. An example method includes determining initial values of modulation phases in a first quadrant, the modulation phases associated with binary codes to be transmitted; and optimizing the initial values to second values to enable a product of an objective function to be within a threshold value.

23 Claims, 7 Drawing Sheets

(56) References Cited

OTHER PUBLICATIONS

Dafesh et al., "Phase-Optimized Constant-Envelope Transmission (POCET) Modulation Method for GNSS Signals", 22nd International Meeting of The Satellite Division of the Institute of Navigation, Savannah, GA, Sep. 22-25, 2009, 7 pages.

Dafesh et al., "Application of POCET Method to Combine GNSS Signals at Different Carrier Frequencies", International Technical Meeting of The Institute of Navigation, San Diego, CA, Jan. 24-26, 2011, 6 pages.

Dafesh et al., "Receiver Compatibility of POCET Signal Combining", International Technical Meeting of the Institute of Navigation, San Diego, CA, Jan. 24-26, 2011, 8 pages.

United States Patent and Trademark Office, "Final Office Action," issued in connection with U.S. Appl. No. 14/465,515, mailed on Mar. 11, 2016, 19 pages.

United States Patent and Trademark Office, "Office Action," issued in connection with U.S. Appl. No. 14/465,515, mailed on Sep. 18, 2015, 22 pages.

European Patent Office, "Extended European Search Report," issued in connection with European Patent Application No. 15170646.2, issued on Dec. 11, 2015, 8 pages.

Yan et al., "Coefficients Optimization Based Quasi-constant Envelope Multiplexing Technique and Its Applications," 2014 International Technical Meeting of The Institute of Navigation, Jan. 2014, 10 pages.

United States Patent and Trademark Office, "Notice of Allowance," issued in connection with U.S. Appl. No. 14/465,515, mailed on Jun. 29, 2016, 19 pages.

United States Patent and Trademark Office, "Advisory Action," issued in connection with U.S. Appl. No. 14/465,515, mailed on Jun. 10, 7 pages.

* cited by examiner

CONSTANT-ENVELOPE PHASE-OPTIMIZED TRANSMISSION METHODS AND APPARATUS

FIELD OF THE DISCLOSURE

This disclosure relates generally to the Code Division Multiple Access Systems and, more particularly, constant-envelope phase-optimized transmission methods and apparatus.

BACKGROUND

The Global Positioning System (GPS) is a space-based satellite navigation system that provides location and time information. In operation, the GPS transmits three binary phase shift key (BPSK) codes. To accommodate the transmission of three or more BPSK codes, in some examples, the component BPSK codes are combined into a composite code prior to being transmitted.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The examples disclosed herein are associated with transmitters and/or satellites that combine binary spreading codes (e.g., PRN sequences and/or pseudo random number sequences). The transmitters and/or satellites may be used for navigation purposes, ranging purposes, communications purposes, surveillance purposes, etc. In some examples, the examples disclosed herein can be used in connection with GPS satellites, binary signal combining and/or in connection with solid state power amplifiers (SSPAs).

Code division multiple access (CDMA) systems such as, for example, the Global Positioning System (GPS), can transmit binary phase shift key (BPSK) codes. To enable the transmission of two or more BPSK codes, in some examples, these BPSK codes are combined into a composite code prior to being transmitted. In some examples, the BPSK codes include code powers (e.g., a user-specified code powers) and the composite code is modeled using a constant envelope approach represented by an amplitude and modulation phases at a given time.

To combine BPSK codes into a composite code using the examples disclosed herein, in some examples, a constant envelope and a modulation phase constellation are estimated for transmitting multiple BPSK codes on the same carrier using an example constant-envelope phase-optimized transmission method and/or apparatus. In some examples, to reduce a dimension of a search space, to reduce cost and/or to increase an overall efficiency of determining the modulation phase constellation, the examples disclosed herein initially optimize and determine fundamental phases and/or modulation phases in one quadrant (e.g., first quadrant modulation phases) without, for example, optimizing and/or determining modulation phases in the remaining quadrants. In some examples, the modulation phases in the remaining quadrants are then constructed and/or determined using the optimized first quadrant modulation phases. For example, the modulation phases in the remaining quadrants can be determined using an example phase symmetry model that determines the remaining phases by reflecting and/or rotating the optimized fundamental phases relative to the complex (I-Q) plane. In some examples, fourth quadrant modulation phases are determined by reflecting the first quadrant modulation phases over a real axis and the second and third quadrant modulation phases are determined by rotating the determined first and fourth quadrant modulation phases relative to the complex (I-Q) plane.

Figure 1:
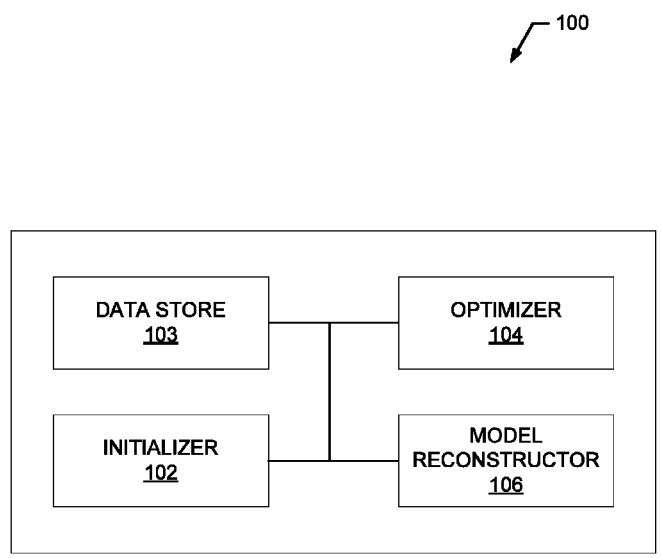
FIG. 1 illustrates an example apparatus that can be used to implement the examples disclosed herein.

FIG. 1 is an example apparatus 100 that can be used to estimate a constant envelope and a modulation phase constellation for transmitting multiple BPSK codes on the same carrier. In some examples, the example apparatus 100 determines a constant amplitude and modulation phase values to satisfy user-specified code powers and code channel assignment requests and/or requirements.

In some examples, to estimate a constant envelope and/or the modulation phase values, the apparatus 100 defines initial phase values using an initializer 102. In some examples, the initializer 102 uses Equation 1 to define a correlation model for a modulation phase value having a constant envelope transmission including a plurality of binary orthogonal codes on an I channel or a Q channel.

For example, with reference to Equation 1, when considering a binary matrix $B=[b_1 b_2 \ldots b_N]$ that contains N binary orthogonal codes, $b_k \in \mathbb{R}^{2^N \times 1}$, $k=1, \ldots, N$, with entries either +1 or −1, each row of the matrix, B, is represented by a modulation phase angle, modulation phase angle $\phi_i \in [-\pi, \pi]$, with $i=1, \ldots, 2^N$, and an amplitude $A \in \mathbb{R}^+$. As shown below in Equation 1, A corresponds to the amplitude, $\phi$ corresponds to the phase modulation vector and N corresponds to the number of codes. Still referring to Equation 1, $b_k$ corresponds to the $k^{th}$ binary orthogonal code and $\phi=[\phi_1 \phi_2 \ldots \phi_{2^N}]^T$ corresponds to the phase constellation. In this example, the amplitude and the phase constellation are the parameters of the correlation model, $y_k(A, \phi)$, in the complex plane of the form of Equation 1. In Equation 1, $$\varphi \in \left\{0, \frac{\pi}{2}\right\}$$

is a code channel assignment parameter used to indicate the transmission channel of the kth code. Specifically, in this example, when $\phi_k=0$, code k is transmitted using channel I and when $$\varphi = \frac{\pi}{2},$$

code k is transmitted using channel Q.

$$y_k(A, \phi) = \frac{A}{2^N} b_k^T c(\phi)\cos\varphi_k + j\frac{A}{2^N} b_k^T s(\phi)\sin\varphi_k, k=1, \ldots, N \quad \text{Equation 1}$$

In some examples, to incorporate user-specified component code powers into the correlation model, $y_k(A, \phi)$, of Equation 1, the initializer 102 uses Equation 2, where the column vectors, $c(\phi), s(\phi) \in \mathbb{R}^{2^N \times 1}$, are defined in Equations 3 and 4 and $P_k$ corresponds to the user-specified code powers.

$$\frac{A}{2^N} b_k^T c(\phi)\cos\varphi_k + j\frac{A}{2^N} b_k^T s(\phi)\sin\varphi_k = \sqrt{P_k}\, e^{j\varphi_k}, k=1,\ldots,N \quad \text{Equation 2}$$

$$c(\phi) \triangleq \begin{bmatrix} \cos(\phi_1) \\ \cos(\phi_2) \\ \vdots \\ \cos(\phi_{2^N}) \end{bmatrix} \quad \text{Equation 3}$$

$$s(\phi) \triangleq \begin{bmatrix} \sin(\phi_1) \\ \sin(\phi_2) \\ \vdots \\ \sin(\phi_{2^N}) \end{bmatrix} \quad \text{Equation 4}$$

Equation 2 can be represented as Equation 5 after some terms are rearranged and the absolute values of the left and right sides of the rearranged Equation 2 are taken.

$$f_k(\phi) = \left\{ \left[\frac{b_k^T c(\phi)\cos\varphi_k}{\sqrt{P_k}}\right]^2 + \left[\frac{b_k^T s(\phi)\sin\varphi_k}{\sqrt{P_k}}\right]^2 \right\}^{\frac{1}{2}} = \frac{2^N}{A}, \quad \text{Equation 5}$$
$$k = 1,\ldots,N.$$

To define an objective function, $J(\phi)$, which incorporates modulation phases and user-specified component code powers, the inializer 102 uses Equations 6 and 7.

Equation 6 is based on evaluating $A = A^*(\phi)$ of Equation 5 and rearranging the terms of Equation 5. In this example, Equation 6 can be used to define the objective function, $J(\phi)$, of Equation 7. Referring to Equation 6, $h_k(\phi)$ corresponds to the ratio of the $k^{th}$ magnitude equation, $f_k(\phi)$, relative to an average magnitude $g(\phi)$. Referring to Equation 7, $J(\phi)$ refers to the objective function as a function of the phase modulation vector $\phi$.

$$h_k(\phi) = \frac{f_k(\phi)}{g(\phi)} = 1, k = 1,\ldots,N \quad \text{Equation 6}$$

$$J(\phi) \triangleq \sum_{k=1}^{N} \|h_k(\phi) - 1\|^2 \quad \text{Equation 7}$$

Equation 8 represents an optimized modulation phase vector.

$$\phi^* = \underset{\phi}{\operatorname{argmin}} J(\phi) \quad \text{Equation 8}$$

After the user specified code powers and channel assignments have been defined by the apparatus 100, to begin the iterative process of optimizing modulation phase values, the initializer 102 uses a quadrature amplitude modulation (QAM) model as represented in Equation 9 to determine the initial phase values. Using Equation 9, in some examples, the initializer 102 specifies a rectangular grid $Z_{QAM}$ of constellation points in the complex plane as a function of the user-specified code powers, $P_k$ and code channel assignments, $\phi_k$ for $k=1,\ldots,N$.

$$z_{QAM} = \sum_{k=1}^{N} b_k \sqrt{P_k} \cos\varphi_k + jb_k \sqrt{P_k} \sin\varphi_k \quad \text{Equation 9}$$

To determine the initial choice(s) and/or seed value(s) of the modulation phase values, the initializer 102 uses Equation 10, where Equation 11 represents the phase angle, $\phi_i^{(O)}$, which is the phase angle associated with the $i^{th}$ entry of the complex vector $Z_{QAM}$. In some examples, data used and/or generated by the initializer 102 is stored at a data store 103.

$$\phi^{(O)} = [\phi_1^{(O)} \phi_2^{(O)} \ldots \phi_{2^N}^{(O)}]^T \quad \text{Equation 10:}$$

$$\phi_i^{(O)} = \arg z_{QAM}^i, i=1,\ldots,2^N = \quad \text{Equation 11:}$$

To optimize modulation phases in a quadrant (e.g., fundamental phases), the example apparatus 100 includes an optimizer 104. In some examples, using the initial values generated by the initializer 102, the apparatus 100 and/or the optimizer 104 optimizes phases obtained from QAM grid points in the first quadrant of the complex plane to aid in the determination of modulation phases in the remaining quadrants.

In this example, Equation 9 is structured such that each quadrant of the complex plane contains $$\frac{2^N}{4}$$

of the QAM grid points. In this example, $z_{QAM}^i$ is structured to enable grid points in the second, third and fourth quadrants to be determined (e.g., completely determined) based on grid points relative to the first quadrant. Thus, using the examples disclosed herein, the grid points and/or the modulation phases determined by the apparatus 100 in the first quadrant are used to determine the grid points and/or modulation phases in the remaining quadrants. In this example, the phases associated with first quadrant of QAM grid points in the complex plane are referred to as fundamental phases and are represented by $$\theta = \begin{bmatrix} \theta_1 \theta_2 \ldots \theta_{\frac{2^N}{4}} \end{bmatrix}^T \text{ with } \theta_i \in [-\pi, \pi], i = 1,\ldots,\frac{2^N}{4}.$$

In some examples, to begin the process of optimizing the modulation phases, the optimizer 104 iteratively searches for modulation phases within a quadrant (e.g., the first quadrant) and/or searches for a quarter of the modulation phases. In this example, the optimizer 104 obtains the initial choice and/or seed values of the modulation phases from the data store 103 and then optimizes the fundamental phase values for the using Equation 12.

In some examples, Equation 12 may be initialized by selecting an initial fundamental phase vector value, $\theta^{(0)}$, using the quadrature amplitude modulation (QAM) model as disclosed in Equations 9 and 11 above and using parameter values determined using Equations 12, 13, 14, 15, 16, 17, 18 and/or 19, for example. Specifically, in some examples, the Gauss-Newton algorithm of Equation 12 is derivable from derivatives of $\hat{h}_k(\theta)$, k=1, . . . , N, as shown in Equation 15, where Equation 15 evaluated at fundamental phase values that are derived by the optimizer 104 using Equation 16 and Equation 17 and where $\circ$ represents the Hadamard product and $$\frac{\partial \hat{g}(\theta)}{\partial \theta} = \frac{1}{N}\sum_{k=1}^{N}\frac{\partial \hat{f}_k(\theta)}{\partial \theta}.$$

In this example, the entries of Equation 13 are specified by Equation 14. Referring to Equation 15, $\hat{H}_k(\theta)$ is the derivative of $\hat{h}_k(\theta)$ with respect to $\theta$ and the optimizer 104 uses Equation 15 to determine the $p^{th}$ iteration of the example Gauss-Newton update given by Equation 12.

Equation 16 represents a quarter code power equation, where $\hat{b}_k$ is constructed from specific rows of $b_k$ such that the selected rows correspond to fundamental phases contained by the constellation, $\phi$. Equation 17 represents the derivative of $\hat{f}_k(\theta)$ with respect to the fundamental phase vector $\theta$, which is used in Equation 15. Equation 18 represents the matrix inverse at iteration p determined using singular value decomposition. Referring to Equation 18, in this example, $\hat{U}^+, \hat{\Sigma}^+, \hat{V}^+$ are determined from the singular value decomposition of $[\hat{H}^{(p)}]^T \hat{H}^{(p)}$, where the matrix $\hat{H}^{(p)}$ is represented by Equation 19.

$$\theta^{(p)} = \theta^{(p-1)} + \hat{L}^{(p)} [\hat{H}^{(p)}]^T \{\hat{h}[\theta^{(p-1)}] - 1_{N \times 1}\} \qquad \text{Equation 12:}$$

$$\hat{h}[\theta^{(p-1)}] \triangleq \begin{bmatrix} \hat{h}_1(\theta^{(p-1)}) \\ \hat{h}_2(\theta^{(p-1)}) \\ \vdots \\ \hat{h}_N(\theta^{(p-1)}) \end{bmatrix} \qquad \text{Equation 13}$$

$$\hat{h}_k(\theta^{(p-1)}) = \frac{\hat{f}_k(\theta)}{\hat{g}(\theta)}\bigg|_{\theta=\theta^{(p-1)}}, k = 1, \ldots, N \qquad \text{Equation 14}$$

$$\hat{H}_k(\theta) = \frac{\partial \hat{h}_k(\theta)}{\partial \theta}$$

$$= \frac{\left[\frac{\partial \hat{f}_k(\theta)}{\partial \theta}\right]\hat{g}(\theta) - \hat{f}_k(\theta)\left[\frac{\partial \hat{g}(\theta)}{\partial \theta}\right]}{\hat{g}^2(\theta)}, \qquad \text{Equation 15}$$

$k = 1, \ldots, N$ $$\frac{A}{2^N}\hat{b}_k^T c(\theta)\cos\varphi_k + j\frac{A}{2^N}\hat{b}_k^T s(\theta)\sin\varphi_k = \frac{\sqrt{P_k}}{4}e^{j\varphi_k}, \qquad \text{Equation 16}$$

$k = 1, \ldots, N$ $$\frac{\partial \hat{f}_k(\theta)}{\partial \theta} = \frac{[\hat{b}_k^T s(\theta)\sin\varphi_k]\left\{\frac{[\hat{b}_k \circ c(\theta)]\sin\varphi_k}{\frac{\sqrt{P_k}}{4}}\right\} - [\hat{b}_k^T c(\theta)\cos\varphi_k]\left\{\frac{[\hat{b}_k \circ s(\theta)]\cos\varphi_k}{\frac{\sqrt{P_k}}{4}}\right\}}{\left\{[\hat{b}_k^T c(\theta)\cos\varphi_k]^2 + [\hat{b}_k^T s(\theta)\sin\varphi_k]^2\right\}^{\frac{1}{2}}}, \qquad \text{Equation 17}$$

$k = 1, \ldots, N$ $$\hat{L}(p) \triangleq \hat{U}^+ [\hat{\Sigma}^+]^{-1} [\hat{V}^+]^T \qquad \text{Equation 18:}$$

$$\hat{H}^{(p)} \triangleq \begin{bmatrix} \hat{H}_1^T(\theta^{(p-1)}) \\ \hat{H}_2^T(\theta^{(p-1)}) \\ \vdots \\ \hat{H}_N^T(\theta^{(p-1)}) \end{bmatrix} \qquad \text{Equation 19}$$

To determine if the fundamental phases determined by the optimizer 104 using Equation 12 are sufficiently optimized, the optimizer 104 uses Equation 20. In some examples, data used and/or generated by the optimizer 102 is stored at the data store 103.

$$\hat{J}[\theta^{(p)}] < \epsilon \qquad \text{Equation 20:}$$

Once the optimizer 104 optimizes the fundamental phases of the first quadrant of the QAM model based on the criteria of, for example, Equation 20, a model reconstructor 106 of the apparatus 100 determines the modulation phases of the second, third and fourth quadrants using a symmetry model of Equation 21. In some examples, the optimizer 104 relates the fundamental phases, $\theta$, and the constellation, $\phi$, using the symmetry model of Equation 21. Specifically, in Equation 21, $P=[P_1 P_2 \ldots P_N]^T$ represents code powers, $\phi=[\phi_1 \phi_2 \ldots \phi_N]^T$ represents channel assignments and $S(P,\phi)$ represents a permutation matrix constructed to determine an entry wise ordering (e.g., a desired entry wise ordering) of the phase constellation, $\phi$, as a function of the code powers, P, and the code channel assignments, $\phi$. In some examples, each identity matrix, I, and zero vector, 0, of Equation 21 has a dimension $$\left(\frac{2^N}{4}\right) \times \left(\frac{2^N}{4}\right)$$

and $$\frac{2^N}{4} \times 1,$$

respectively.

$$\phi = S(P, \varphi)\left(\begin{bmatrix} I \\ -I \\ -I \\ I \end{bmatrix} \theta + \begin{bmatrix} 0 \\ 0 \\ \pi I \\ -\pi I \end{bmatrix}\right) \quad \text{Equation 21}$$

To determine an optimized amplitude having a constant envelope as a closed form function of the optimized modulation phases, the model reconstructur 106 uses Equation 22. In this example, Equation 22 represents a closed form expression of the amplitude, A, as a function of the modulation phase constellation, φ, after taking the average of the magnitude functions given in Equation 5 with $$g(\phi) = \frac{1}{N}\sum_{k=1}^{N} f_k(\phi).$$

Referring to Equation 22, A*(φ) corresponds to the closed form estimator of amplitude as a function of the modulation phase vector, φ, and g(φ) corresponds to an average magnitude. In some examples, data used and/or generated by the model reconstructor 106 is stored at the data store 103.

$$A^*(\phi) = \frac{2^N}{g(\phi)} \quad \text{Equation 22}$$

While an example manner of implementing the apparatus 100 is illustrated in FIG. 1, one or more of the elements, processes and/or devices illustrated in FIG. 1 may be combined, divided, re-arranged, omitted, eliminated and/or implemented in any other way. Further, the example initializer 102, the example data store 103, the example optimizer 104, the example model reconstructor 106 and/or, more generally, the example apparatus 100 of FIG. 1 may be implemented by hardware, software, firmware and/or any combination of hardware, software and/or firmware. Thus, for example, any of the example initializer 102, the example data store 103, the example optimizer 104, the example model reconstructor 106 and/or, more generally, the example apparatus 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)) including field programmable gate arrays (FPGAs). When reading any of the apparatus or system claims of this patent to cover a purely software and/or firmware implementation, at least one of the example initializer 102, the example data store 103, the example optimizer 104, the example model reconstructor 106 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 may include one or more elements, processes and/or devices in addition to, or instead of, those illustrated, and/or may include more than one of any or all of the illustrated elements, processes and devices.

Figure 2:
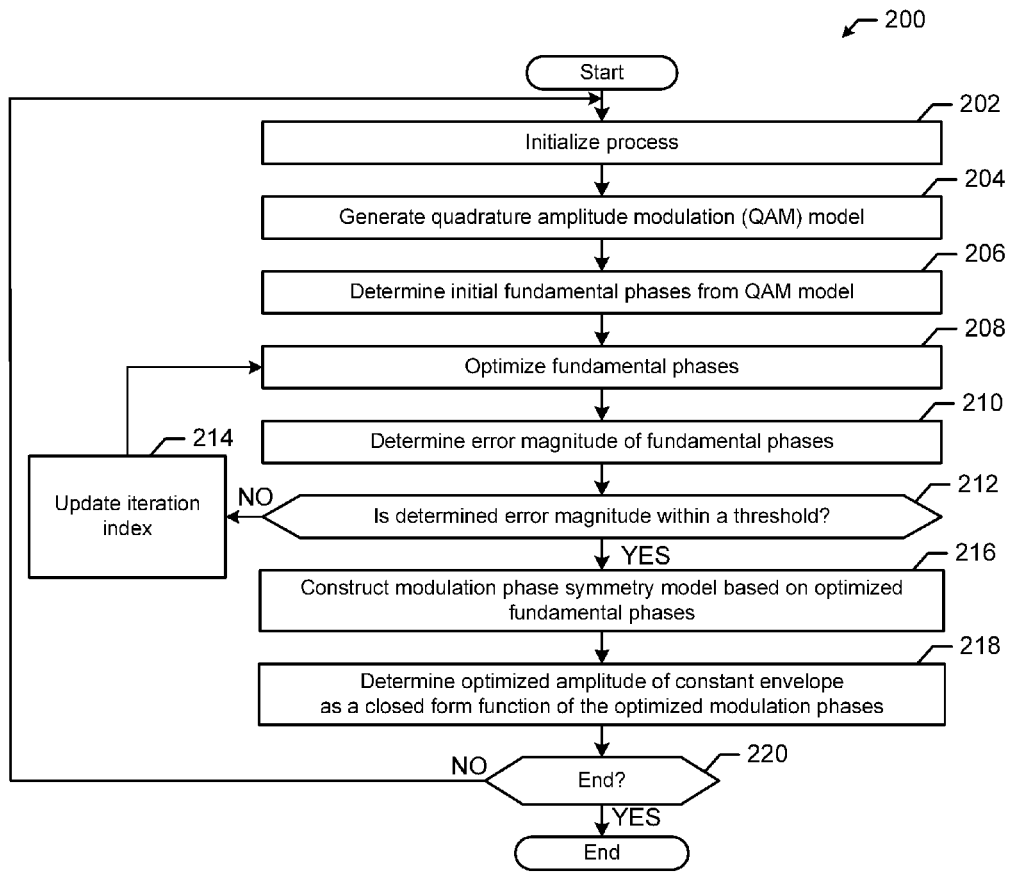
FIGS. 2 and 3 are flowcharts representative of methods that may be performed to implement the apparatus of FIG. 1.

A flowchart representative of an example method 200 for implementing the apparatus 100 of FIG. 1 is shown in FIG. 2. In this example, the method 200 may be implemented using the machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 812 and/or embodied in firmware or dedicated hardware. Further, although the example program is described with reference to the apparatus illustrated in FIG. 1, many other methods of implementing the example apparatus 100 may alternatively be used. For example, the order of execution of the blocks may be changed, and/or some of the blocks described may be changed, eliminated, or combined.

As mentioned above, the example method 200 of FIG. 2 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any unit duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example method 200 of FIG. 2 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any unit duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 3:
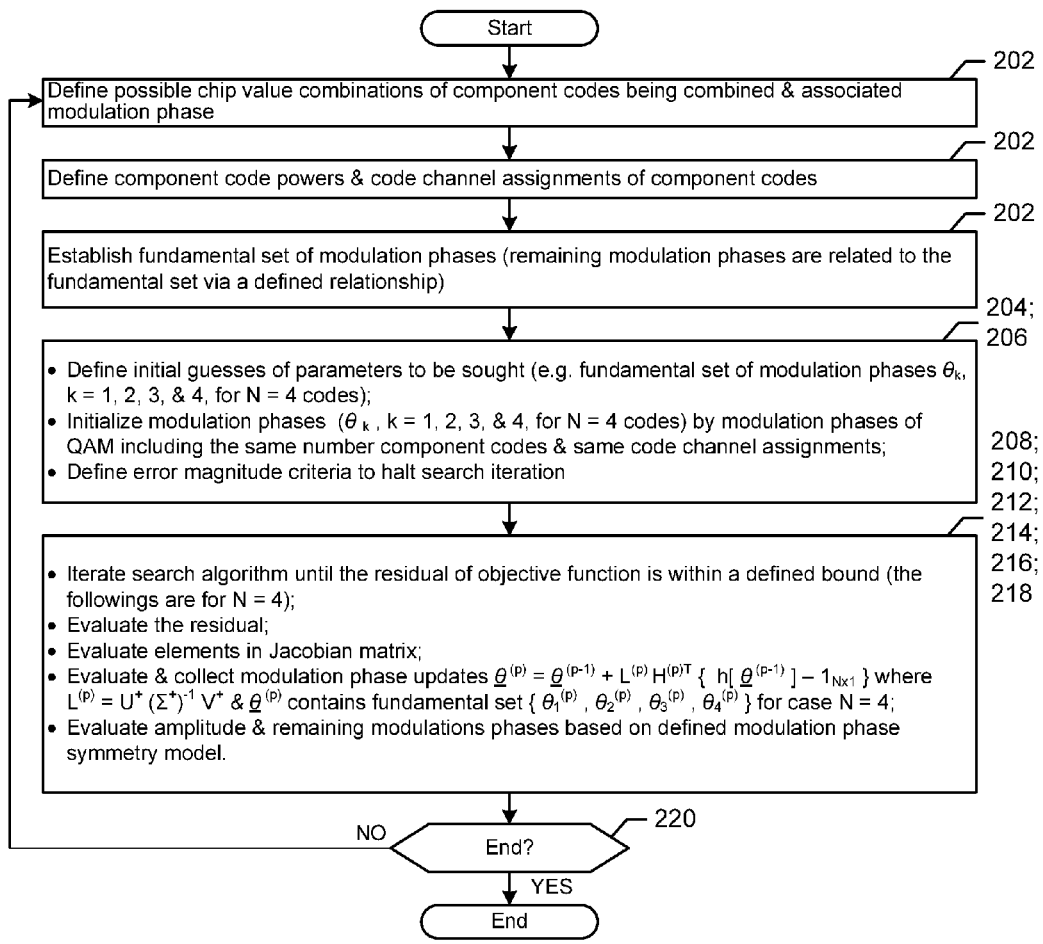
Figure 4:
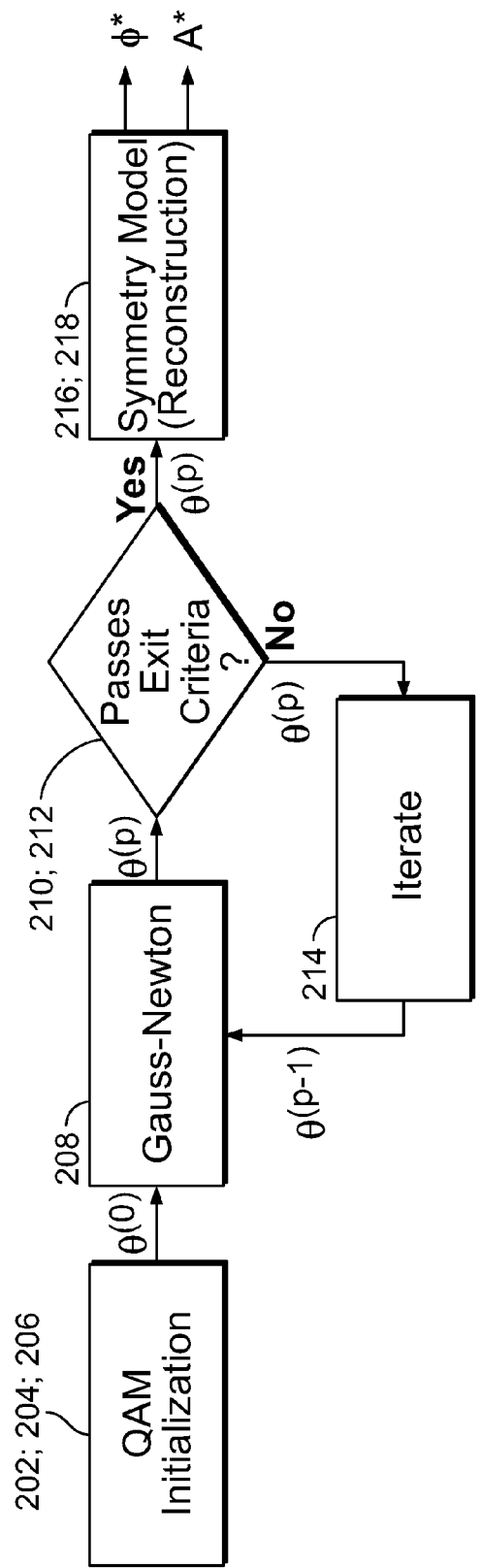
FIG. 4 is a flowchart representative of a method that may be performed to implement the apparatus of FIG. 1.

The method 200 of FIG. 2 will be described in combination with FIGS. 3 and 4 where FIG. 3 is another flowchart depicting portions of the method 200 of FIG. 2 in more detail and FIG. 4 is a flowchart depicting portions of the method 200 of FIG. 2 in more detail. The method 200 of FIG. 2 may begin with the initializer 102 initializing the process (block 202). In some examples, initializing the process includes defining a correlation model using Equation 1 and/or obtaining and/or incorporating user-specified component code powers and/or code channel assignments of the component codes into the correlation model using, for example, Equation 2. Additionally or alternatively, in some examples, initializing the process includes defining an objective function using Equations 6 and 7.

The initializer 102 generates a quadrature amplitude modulation (QAM) model (block 204) using, for example, Equation 9. In some examples, the QAM model represents coordinates of a rectangular grid of constellation points in the complex plane as a function of the user-specified code powers and code channel assignments. Using the generated QAM model, the initializer 102 determines initial values of the fundamental phases (block 206) using, for example, Equations 10 and 11. In some examples, the fundamental phases relate to modulation phases that are within the first quadrant. Additionally or alternatively, in some examples, the initializer 102 defines the error magnitude, $\epsilon$, of Equation 20, that is used as an exit criteria for the objective function.

The optimizer 104 then optimizes the fundamental phases (block 208) using, for example, Equation 12. To determine if the determined fundamental phases are sufficiently optimized, the optimizer 104 determines an error magnitude of the determined fundamental phases (block 210) using, for example, the objective function of Equation 20. The optimizer 104 determines if the error magnitude is within a threshold (block 212) using, for example, Equation 20. In some examples, if the determined error magnitude is not equal to or less than a threshold error value, the optimizer 104 updates an iteration index (block 214) prior to revising and/or optimizing the fundamental phase entries during the next iteration.

However, if the determined error magnitude is equal to or less than the threshold error value, the model reconstructor 106 constructs a modulation phase symmetry model based on the optimized fundamental phases (block 216) using, for example, Equation 21. For example, the model reconstructor 106 can determine the modulation phases in the second, third and fourth quadrants using a reflection process and/or a rotation process based on the determined fundamental phases. The model reconstructor 106 determines the optimized amplitude having a constant envelope as a closed form function of the optimized modulation phases (block 218) using, for example, Equation 22. At block 220, the processor 812 determines whether or not to end the process of FIG. 2.

Figure 5:
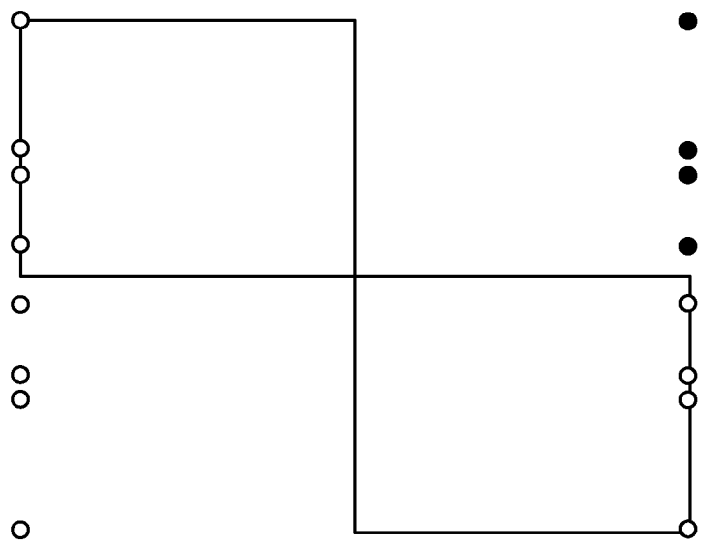
FIGS. 5-7 show results obtained using the examples disclosed herein.

To illustrate the symmetry of the grid points contained within each quadrant, FIG. 5 shows the symmetry of QAM grid points (N=4) associated with specific code powers and code channel assignments for the case of N=4. In some examples, the results depicted in FIG. 5 are determined using Equation 9.

Figure 6:
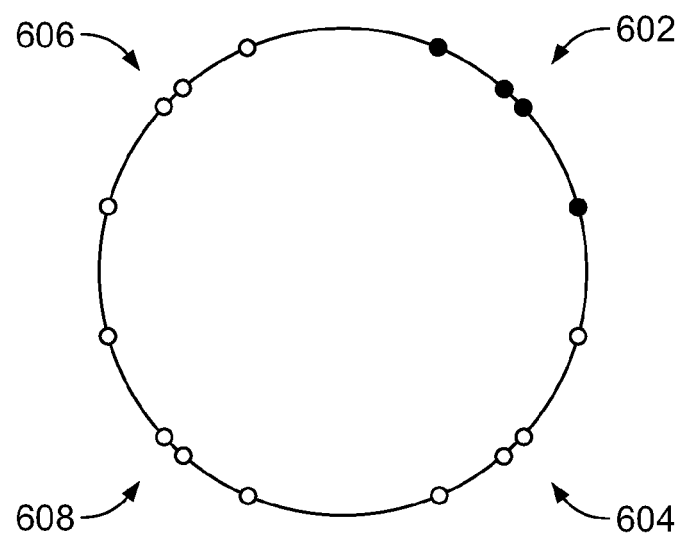

FIG. 6 shows a constellation of $\phi^{(o)}$ that may be generated based on the results of FIG. 5 and/or Equations 9-11. As shown in FIG. 6, QAM grid points 602 that are contained within the first quadrant are represented by solid dots. In some examples, QAM grid points 604 in the fourth quadrant are determined by reflecting the QAM grid points 602 relative to a real axis. In some examples, QAM grid points 606, 608 in the second and third quadrants, respectively, are determined by rotating the QAM grid points 602, 604 relative to the complex (I-Q) plane. In some examples, the constellation of $\phi^{(o)}$ is computed directly from $Z_{QAM}$.

Figure 7:
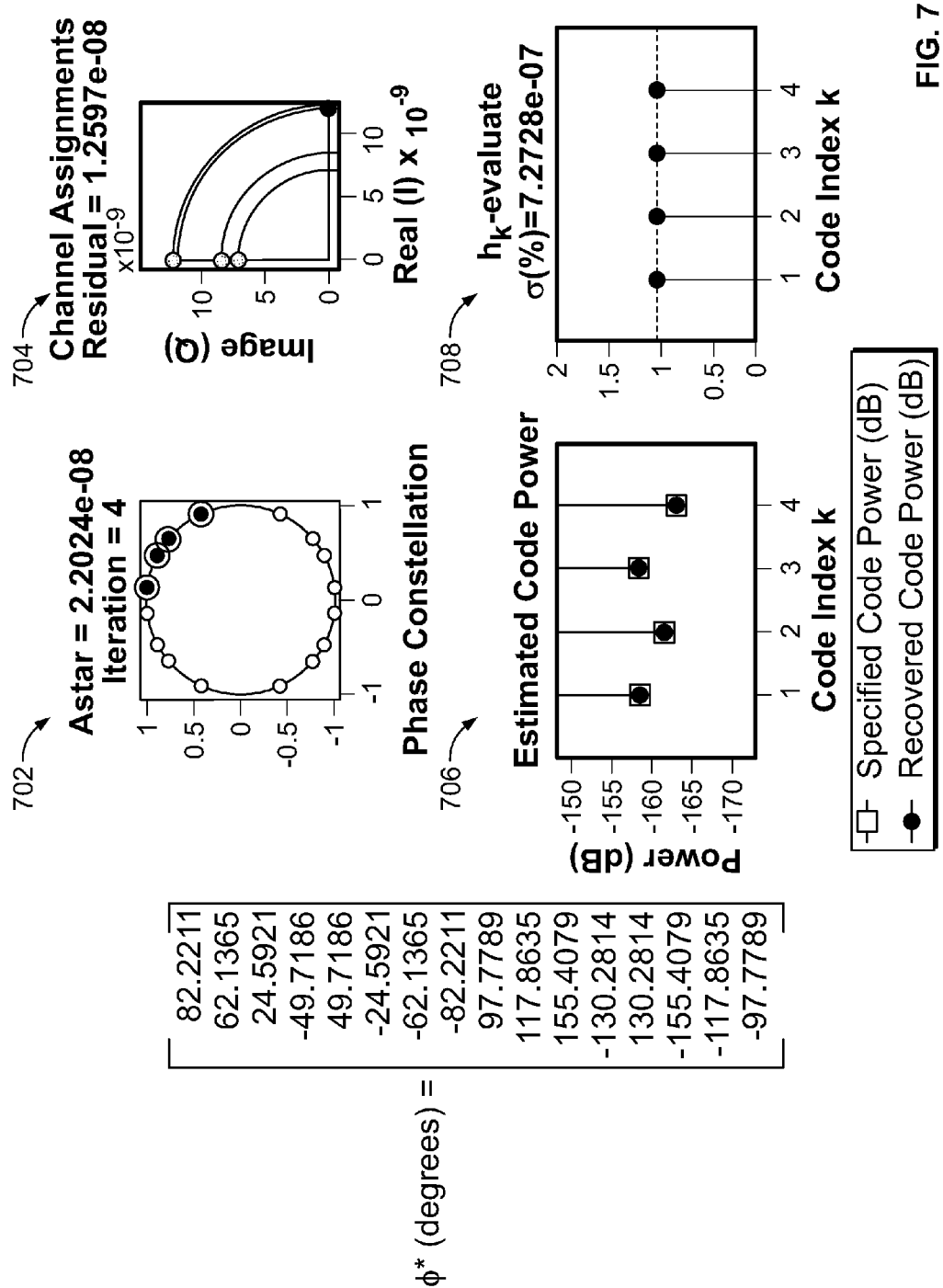

FIG. 7 shows results obtained using the examples disclosed herein. Specifically, reference number 702 shows a phase constellation, $\phi^*$, with numerical values shown in the left most region, reference number 704 shows a complex correlation in linear domain, reference number 706 shows estimated code powers in logarithmic domain and reference number 708 shows a nonlinear exit criteria.

Figure 8:
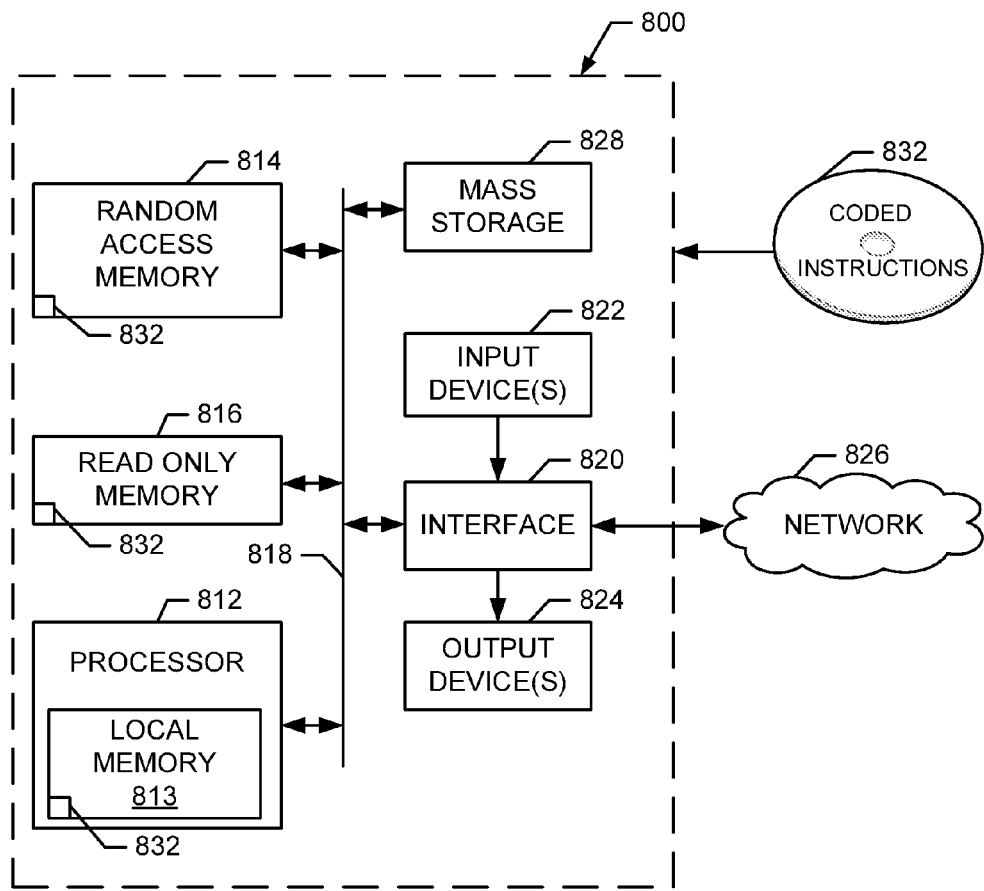
FIG. 8 is a processor platform that may be used to implement the examples described herein.

FIG. 8 is a block diagram of an example processor platform 800 capable of executing instructions to implement the methods of FIGS. 2-4 and the apparatus 100 of FIG. 1. The processor platform 800 can be, for example, a server, a personal computer, a mobile device (e.g., a cell phone, a smart phone, a tablet such as an iPad™) a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 2-4 may be stored in the mass storage device 828, in the volatile memory 814, in the non-volatile memory 816, and/or on a removable tangible computer readable storage medium such as a CD or DVD.

From the foregoing, it will appreciated that the above disclosed methods, apparatus and articles of manufacture relate to signal combining a constant envelope and modulation phase constellation for transmitting multiple signals onto the same carrier. In some examples, the signal is optimized for transmission while providing less complex hardware and/or power efficient implementations.

In some examples, the modulation phase constellation is generated using fundamental phases (e.g., first quadrant modulation phases) that reduce the dimension of the search problem. In some examples, an example Gauss-Newton approach is initialized by the modulation phases of a quadrature amplitude modulation (QAM) scheme that uses singular value decomposition (SVD) when determining the fundamental phases and/or the fundamental phase vector. In some examples, an example symmetry model is used to relate the determined fundamental phases and/or the fundamental phase vector to the complete phase constellation. In some examples, a constant amplitude in closed form can be determined based on the optimized fundamental phases.

In some examples, an example search algorithm determines an optimal amplitude and/or optimal modulation phases for a signal combining technique including binary spreading codes. In some examples, the optimal amplitude and/or the optimal modulation phases are determined using an example objective function which, in some examples, does not include an amplitude. The examples disclosed herein iteratively search for a quarter of the modulation phases (e.g., the fundamental phases) and then construct and/or determine the remaining modulation phases and/or the amplitude after the quarter of the modulation phases are optimized. In some examples, expressions for elements in a Jocobian matrix are used without approximation. In some examples, the optimized amplitude is provided in closed form as a function of the optimized modulation phases.

In some examples, the examples disclosed herein can be used in connection with GPS Payload solution & programs using Solid State Power Amplifiers (SSPAs). In some examples, the examples disclosed herein can be incorporated into a baseline system design.

In some examples, the examples disclosed herein are associated with transmitters and/or satellites that combine binary spreading codes (e.g., PRN sequences and/or pseudo random number sequences). The transmitters and/or satellites may be used for navigation purposes, ranging purposes, communications purposes, surveillance purposes, etc. In some examples, the examples disclosed herein can be used in connection with GPS satellites, binary signal combining and/or in connection with solid state power amplifiers (SSPAs).

In some examples, an example method includes defining a correlation model for a modulation phase constellation for constant envelope transmission of a plurality of binary codes; and iteratively determining a fundamental phase vector that contains optimized modulation phases for the correlation model. In some examples, the transmission of the plurality of binary codes includes transmitting the plurality of binary orthogonal codes on I and Q channels. In some examples, the correlation model includes user-specified component code powers for the plurality of binary codes. In some examples, an initial phase constellation is determined using a QAM model. In some examples, the correlation model includes defining amplitude as a function of the optimized modulation phase constellation. In some examples, optimizing the fundamental phases includes exiting an iteration based on exit criteria. In some examples, iteratively determining fundamental phases includes determining a quarter of the modulation phases and using a symmetry model to determine a modulation phase constellation. In some examples, binary codes are combined based on the modulation phase constellation. In some examples, the combined codes are transmitted.

The examples disclosed herein relate to determining an optimal amplitude and optimal modulation phases of a signal combining technique including binary spreading codes. In some examples, an example objective function is defined by defining a correlation model for modulation phase constellation for constant envelope transmission of a plurality of binary orthogonal codes on I channel and Q channel; incorporating user-specified component code powers and user-specified code channel assignment into the correlation model; defining amplitude as a function of optimized modulation phases; and defining an objective function by incorporating modulation phases & user-specified component code powers, user-specified code channel assignment and solving for the optimized phase constellation.

In some examples, an initial choice for a phase constellation is determined using a QAM model. In some examples, the remainder of modulation phase constellation is determined by determining and/or optimizing a fundamental phase vector; using a modulation phase symmetry model; iteratively searching for a quarter of modulation phases using the initial phase constellation choice from the QAM model; optimizing the determined fundamental phases using an example Gauss-Newton method; and exiting the iteration with when exit criteria is met.

In some examples, the remaining modulation phase & amplitude are constructed after the quarter of modulation phases are optimized; the elements within a Jacobian are used without approximation; the amplitude is determined in closed form as a function of the optimized modulation phases; and both amplitude and optimal modulation phases are formed and/or transmitted as a composite signal.

As set forth herein, an example method includes determining initial values of modulation phases in a first quadrant, the modulation phases associated with binary codes to be transmitted; and optimizing the initial values to second values to enable a product of an objective function to be within a threshold value. In some examples, the method includes determining third values of modulation phases in a fourth quadrant based on the second values. In some examples, the third values are determined by reflecting the second values relative to an axis. In some examples, the method includes determining fourth values of modulation phases in a second quadrant and fifth values of modulation phases in a third quadrant, the fourth and fifth values based on the second values.

In some examples, the fourth and fifth values are determined by rotating the second and third values relative to axes. In some examples the method includes including determining an amplitude based the second, third, fourth, and fifth values. In some examples, the amplitude is associated with a constant envelope. In some examples, the method includes obtaining code powers of the binary codes. In some examples, the objective function is based on the code powers. In some examples, the method includes using a symmetry model to determine values of modulation phases in a second quadrant, a third quadrant, and a fourth quadrant based on the second values.

In some examples, the method includes combining the binary codes based on the modulation phases. In some examples, the method includes transmitting the binary codes. In some examples, the method includes optimizing the initial values include not optimizing modulation phases in a second quadrant, a third quadrant, and a fourth quadrant.

An example apparatus includes a database to store initial values of modulation phases in a first quadrant, the modulation phases associated with binary codes to be transmitted; and a processor, to: based on the initial values obtained from the database, optimize the initial values to second values to enable a product of an objective function to be within a threshold value.

In some examples, the processor is to determine third values of modulation phases in a fourth quadrant based on the second values. In some examples, the processor is to determine fourth values of modulation phases in a second quadrant and fifth values of modulation phases in a third quadrant, the fourth and fifth values based on the second values. In some examples, the processor is to determine an amplitude based the second, third, fourth, and fifth values.

An example tangible machine-readable storage medium comprising instructions which, when executed, cause a machine to at least: determine initial values of modulation phases in a first quadrant, the modulation phases associated with binary codes to be transmitted; and optimize the initial values to second values to enable a product of an objective function to be within a threshold value. In some examples, the instructions which, when executed, cause a machine to at least determine third values of modulation phases in a fourth quadrant based on the second values. In some examples, the instructions which, when executed, cause a machine to at least determine fourth values of modulation phases in a second quadrant and fifth values of modulation phases in a third quadrant, the fourth and fifth values based on the second values.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   determining initial values of modulation phases in a first quadrant using an initializer, the initial values of the modulation phases representing approximately one quarter of a total of the modulation phases in the first quadrant, a second quadrant, a third quadrant, and a fourth quadrant, when determining the initial values of the modulation phases in the first quadrant, values of modulation phases in the second quadrant, the third quadrant, and the fourth quadrant are not being initially determined, the modulation phases associated with binary codes to be transmitted; and
   optimizing the initial values to second values of the modulation phases to enable a product of an objective function to be within a threshold value using an optimizer, at least one of the initializer or the optimizer being implemented by a logic circuit.

2. The method of claim 1, further including determining third values of modulation phases in a fourth quadrant based on the second values.

3. The method of claim 2, wherein the third values are determined by reflecting the second values relative to an axis.

4. The method of claim 2, further including determining fourth values of modulation phases in the second quadrant and fifth values of modulation phases in the third quadrant, the fourth values and the fifth values based on the second values.

5. The method of claim 4, wherein the fourth values and the fifth values are determined by rotating the second values and the third values relative to axes.

6. The method of claim 4, further including determining an amplitude based on the second values, the third values, the fourth values, and the fifth values.

7. The method of claim 6, wherein the amplitude is associated with a constant envelope.

8. The method of claim 1, further including obtaining code powers of the binary codes.

9. The method of claim 8, wherein the objective function is based on the code powers.

10. The method of claim 1, further including using a symmetry model to determine values of modulation phases in the second quadrant, the third quadrant, and the fourth quadrant based on the second values.

11. The method of claim 1, further including combining the binary codes based on the modulation phases.

12. The method of claim 11, further including transmitting the binary codes.

13. The method of claim 1, wherein optimizing the initial values includes not optimizing modulation phases in the second quadrant, the third quadrant, and the fourth quadrant.

14. The method of claim 1, wherein determining the initial values of the modulation phases in the first quadrant includes determining the initial values of the modulation phases using a quadrature amplitude modulation model.

15. The method of claim 14, wherein the quadrature amplitude modulation model represents coordinates of a rectangular grid of constellation points in a complex plane as a function of code powers and code channel assignments.

16. The method of claim 1, further including determining the modulation phases in the second quadrant, the third quadrant, and the fourth quadrant using at least one of a reflection process or a rotation process based on the second values.

17. An apparatus, comprising:
    a database to store initial values of modulation phases in a first quadrant, the modulation phases associated with binary codes to be transmitted, the initial values of the modulation phases representing approximately one quarter of a total of the modulation phases in the first quadrant, a second quadrant, a third quadrant, and a fourth quadrant, the initial values of the modulation phases in the first quadrant not including values of modulation phases in the second quadrant, the third quadrant, and the fourth quadrant; and
    a processor including an optimizer implemented with a logic circuit, the optimizer is to:
       based on the initial values obtained from the database, optimize the initial values to second values of the modulation phases to enable a product of an objective function to be within a threshold value.

18. The apparatus of claim 17, wherein the processor is to determine third values of modulation phases in the fourth quadrant based on the second values.

19. The apparatus of claim 18, wherein the processor is to determine fourth values of modulation phases in the second quadrant and fifth values of modulation phases in the third quadrant, the fourth values and the fifth values based on the second values.

20. The apparatus of claim 19, wherein the processor is to determine an amplitude based on the second values, the third values, the fourth values, and the fifth values.

21. A tangible machine-readable storage medium comprising instructions which, when executed, cause a machine to at least:

determine initial values of modulation phases in a first quadrant, the modulation phases associated with binary codes to be transmitted, the initial values of the modulation phases representing approximately one quarter of a total of the modulation phases in the first quadrant, a second quadrant, a third quadrant, and a fourth quadrant, when determining the initial values of the modulation phases in the first quadrant, values of modulation phases in the second quadrant, the third quadrant, and the fourth quadrant are not being initially determined; and optimize the initial values to second values of the modulation phases to enable a product of an objective function to be within a threshold value.

22. The tangible machine-readable storage medium of claim 21 comprising instructions which, when executed, cause a machine to at least determine third values of modulation phases in the fourth quadrant based on the second values.

23. The tangible machine-readable storage medium of claim 22 comprising instructions which, when executed, cause a machine to at least determine fourth values of modulation phases in the second quadrant and fifth values of modulation phases in the third quadrant, the fourth values and the fifth values based on the second values.

* * * * *